United States Patent [19]
Yoshida et al.

[11] Patent Number: 4,501,004
[45] Date of Patent: Feb. 19, 1985

[54] DEVICE FOR ELIMINATING FM OR LIKE INTERFERENCE FROM A DIGITAL MICROWAVE SIGNAL

[75] Inventors: Yasuharu Yoshida; Hiroshi Seguchi; Yoshimi Tagashira, all of Tokyo, Japan

[73] Assignee: Nippon Electric Co., Ltd., Tokyo, Japan

[21] Appl. No.: 460,961

[22] Filed: Jan. 25, 1983

[30] Foreign Application Priority Data

Jan. 30, 1982 [JP] Japan .................................. 57-12544
Jan. 30, 1982 [JP] Japan .................................. 57-12545

[51] Int. Cl.³ ............................................. H04B 1/12
[52] U.S. Cl. .................................. 375/102; 455/304; 455/306
[58] Field of Search .............. 455/296, 303, 304, 305, 455/306, 311; 375/99, 102, 103; 328/163; 381/94

[56] References Cited

U.S. PATENT DOCUMENTS 3,480,867 11/1969 Sichak .................. 455/304
3,963,990 6/1976 DiFonzo ............... 455/304
4,053,932 10/1977 Yamaguti et al. ..... 455/305
4,177,430 12/1979 Paul ..................... 455/306
4,330,764 5/1982 Miedema ............... 455/305
4,380,082 4/1983 Namiki ................. 375/102

Primary Examiner—Benedict V. Safourek
Attorney, Agent, or Firm—Sughrue, Mion, Zinn, Macpeak & Seas

[57] ABSTRACT

In an interference elimination device for use in a digital microwave communication system in which an interference component results from at least one different microwave communication system sharing a frequency band in common, a controller (21) controls a device input signal so that a controlled signal thereby produced may include a controlled component which is equal in amplitude to the interference component and be antiphase relative thereto. The controlled signal is subtracted from the device input signal to provide a difference signal which is free from the interference component. Together with the device input signal, the difference signal is supplied to a control signal producing circuit (41) for producing an amplitude and a phase control signal for the controller. Instead of the device input signal, an interference signal derived by causing the device input signal to pass through a narrow-band filter (11 or 12) may be delivered to the controller and the control signal producing circuit. It is possible to use the difference signal as a device output signal and to implement the control signal producing circuit by an orthogonal multiplier.

5 Claims, 5 Drawing Figures

FIG. 2
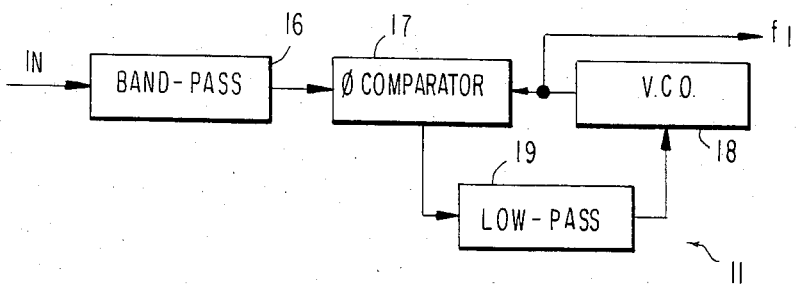
FIG. 3
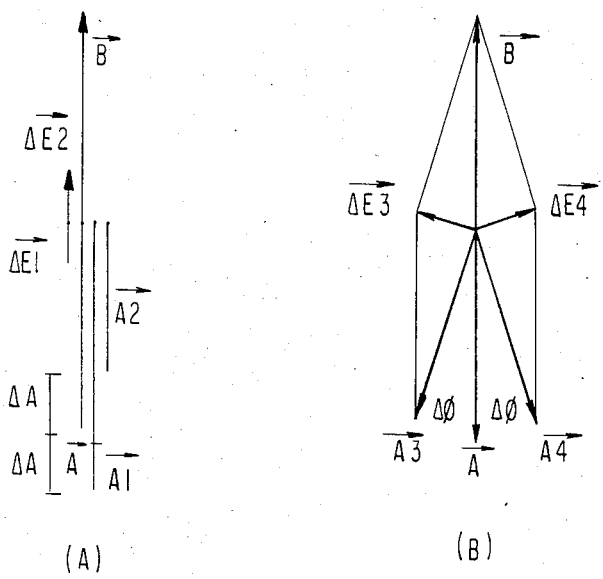
(A)          (B)
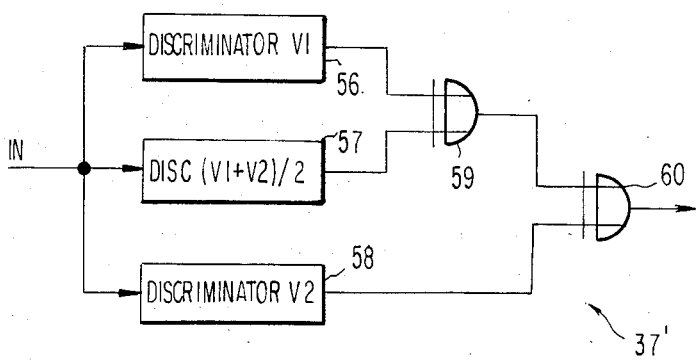
FIG 4

DEVICE FOR ELIMINATING FM OR LIKE INTERFERENCE FROM A DIGITAL MICROWAVE SIGNAL

BACKGROUND OF THE INVENTION

This invention relates to a device for use in a digital microwave communication system in substantially exempting a device output signal from interference which results in a device input signal from at least one different microwave communication system as, for example, a frequency modulation microwave communication system which shares a frequency band with the digital microwave communication system.

A digital microwave communication system has recently become in practical use and is to be substituted for frequency modulation microwave communication systems which have widely been in use. In this transient state, it is inevitable that a digital microwave communication system shares a certain frequency band with a frequency modulation microwave communication system and that interference occurs in the digital microwave communication system from the frequency modulation microwave communication system. Like interference is unavoidable when a digital microwave communication system shares a frequency band with at least one different microwave communication system. It is therefore mandatory to provide an interference elimination device for use in a digital microwave communication system.

SUMMARY OF THE INVENTION

It is therefore a general object of the present invention to provide an interference elimination device for use in a digital microwave communication system in substantially eliminating the frequency modulation or the like interference of the type described above.

It is another general object of this invention to provide an interference elimination device of the type described, which is simple in structure and yet is capable of eliminating the interference to an astonishing extent.

It is a specific object of an aspect of this invention to provide an interference elimination device of the type described, which is operable in an intermediate frequency band.

According to this invention, there is provided an interference elimination device for use in a digital microwave communication system. The device according to this invention is responsive to a device input signal accompanied by an interference component for substantially eliminating the interference component and comprises control means, subtracting means, and control signal producing means as follows.

The control means is responsive to an amplitude and a phase control signal for amplitude and phase controlling an interference signal to produce an amplitude and phase controlled signal. The interference signal is derived by causing the device input signal to pass through a narrow-band filter.

The subtracting means is for subtracting the amplitude and phase controlled signal from the device input signal to produce a difference signal.

The control signal producing means is responsive to the difference signal and the above-mentioned predetermined one of the device input signal and the interference signal for producing the amplitude and the phase control signals.

BRIEF DESCRIPTION OF THE DRAWING

FIG. 2 is a block diagram of a narrow-band filter for use in the interference elimination device shown in FIG. 1;

FIG. 3 is a schematic vector diagram for use in describing operation of the interference elimination device illustrated in FIG. 1, FIG. 3 (A) showing the amplitude and FIG. 3 (B), the phase;

FIG. 4 is a block diagram of an alternative residual component regenerator for use in the interference elimination device depicted in FIG. 1.

DESCRIPTION OF THE PREFERRED EMBODIMENTS

Figure 1:
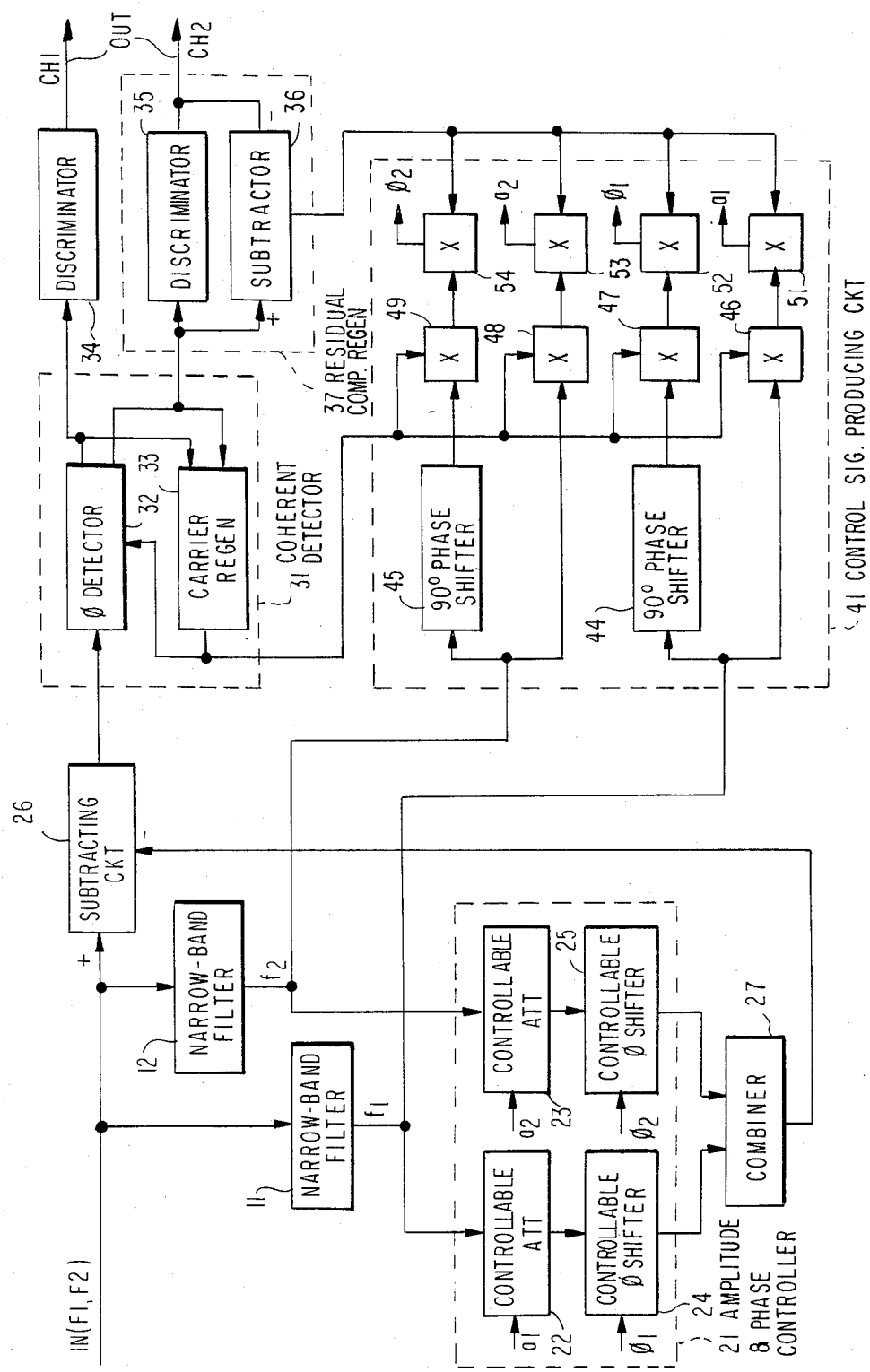
FIG. 1 is a block diagram of an interference elimination device according to a first embodiment of the instant invention.

Referring to FIG. 1, an interference elimination device according to a first embodiment of the present invention, is for use in a digital microwave communication system and is responsive to a device input signal IN accompanied by an interference component for producing a device output signal OUT in which the interference component is substantially eliminated. Merely by way of example, it will be assumed that the digital microwave communication system is a 4PSK (four-phase phase shift keying) digital microwave communication system. For the device being illustrated, the device input signal IN is an IF (intermediate frequency) signal. The device output signal OUT consists of first and second data output signals CH1 and CH2. The interference component is presumed to result from two carrier components of FM (frequency modulation) microwave communication systems which share a certain frequency band with the 4PSK system. The interference component therefore consists of first and second interference components F1 and F2. The interference components F1 and F2 are extracted from the device input signal IN by first and second narrow-band filters 11 and 12 as first and second interference signals f1 and f2.

Turning to FIG. 2, the first narrow-band filter 11 may comprise a phase-locking bop type of tracking filter including a band-pass filter 16 for subjecting the device input signal IN to band limitation and for thereby improving the C/N (carrier-to-noise ratio) of the first interference component F1 to a certain degree. The C/N improved interference component is delivered to a phase comparator 17 and phase compared with a local signal generated by a voltage controlled oscillator 18. A phase error signal produced by the phase comparator 17 is fed back to the voltage controlled oscillator 18 through a low-pass filter 19. The local signal is thereby phase-locked to the C/N improved interference component. The local signal is taken out as the first interference signal f1. It is possible to likewise implement the second narrow-band filter 12.

It is to be noted in connection with the structure illustrated with reference to FIG. 2 that the narrow-band filter 11 or 12 has a loop bandwidth determined by the low-pass filter 19. The band-pass filter 16 is therefore unnecessary in principle. use of the band-pass filter 16 is, however, preferred because the C/N of the interference component F1 or F2 is seriously objectionable in the device input signal IN. In this regard, the band-pass filter 16 is for stabilizing the hardware operation of the phase comparator 17. Incidentally, the band-pass filter 16 should have a sufficiently narrow band width so as to make the narrow-band filter 11 or 12 establish the phase coincidence.

Referring back to FIG. 1, the first and the second interference signals f1 and f2 are supplied to an amplitude and phase control circuit 21 which is controlled by first and second amplitude control signals a1 and a2 and first and second phase control signals $\phi 1$ and $\phi 2$ as will become clear as the description proceeds. In the amplitude and phase control circuit 21, the first and the second interference signals f1 and f2 are supplied to first and second controllable attenuators 22 and 23 and thence to first and second controllable phase shifters 24 and 25.

An amplitude and phase controlled signal consisting of two parts produced by the respective controllable phase shifters 24 and 25, is delivered to a subtracting circuit 26 through a combiner 27. The subtracting circuit 26 is for subtracting the amplitude and phase controlled signal from the device input signal IN to produce a difference signal. More particularly, the difference signal as herein called, is derived by combining the device input signal IN with the amplitude and phase controlled signal which is amplitude and phase controlled, in a stationary state of operation of the interference elimination device, so as to be equal in amplitude or level to the interference component in the device input signal IN and be antiphase relative to the interference component. The subtracting circuit 26 is therefore equivalent to an adder. At any rate, the difference signal is exempted from the interference component.

Turning to FIG. 3, it should be noted that the interference component is variable in the device input signal IN dependent on the meteorological and other conditions of the propagation route for the FM microwave signal. It may therefore be that the difference signal includes a residual of the interference component as a residual component. In FIGS. 3 (A) and (B), let the device input signal IN include an original interference component represented by a vector A. Merely for simplicity of denotation, the vector A and the like will be designated in the following description by the corresponding usual letters A and so forth. In the stationary state mentioned above, the amplitude and phase controlled signal comprises an antiparallel signal B, which has the same amplitude (absolute value, FIG. 3 (A)) as the original interference component A and is antiphase (FIG. 3 (B)) relative thereto.

In a typical case in which the original interference component A is subjected to an amplitude fluctuation $\Delta A$ exaggerated in FIG. 3 (A), an amplitude varied component A1 or A2 appears in the device input signal IN. If the anti-parallel signal B is kept in the amplitude and phase controlled signal as it was, the residual component becomes a vector $\Delta E1$ or $\Delta E2$. The residual components $\Delta E1$ and $\Delta E2$ are inphase and antiphase, respectively, relative to the amplitude varied components A1 and A2.

In another typical case in which the original interference component A undergoes a phase fluctuation $\Delta \phi$ exaggerated in FIG. 3 (B), a phase varied component A3 or A4 results in the device input signal IN. The residual component becomes another vector $\Delta E3$ or $\Delta E4$. The residual components $\Delta E3$ and $\Delta E4$ have orthogonal phase differences of 90° and 270° relative to the respective phase varied components A3 and A4.

Referring back to FIG. 1 again, such a difference signal is delivered to a coherent detector 31. In the example being illustrated, the coherent detector 31 comprises a four-phase phase detector 32 for subjecting the difference signal to four-phase phase detection by the use of a reference carrier signal regenerated at a carrier regenerator 33 from first and second detector output signals of the phase detector 32. First and second discriminators or decision circuits 34 and 35 are for subjecting the first and the second detector output signals to binary discrimination to produce the first and the second data output signals CH1 and CH2 as the device output signal OUT.

It is possible to understand that a combination of the coherent detector 31 and the first and the second discriminators 34 and 35 serves as an output signal producing circuit responsive to the difference signal for producing the device output signal OUT. The carrier regenerator 33 is responsive to the difference signal for regenerating a carrier component of the device input signal IN.

A subtractor 36 is coupled to an optional one of the first and the second discriminators 34 and 35 to subtract the data output signal CH1 or CH2 from the detector output signal supplied to that discriminator 34 or 35. A combination of the discriminator 34 or 35 and the subtractor 36 serves as a residual component regenerator 37 responsive to the device and the detector output signal for regenerating the residual component.

A control signal producing circuit comprises the residual component regenerator 37 and an amplitude and phase control signal producing circuit 41. The residual component regenerator 37 and the amplitude and phase control signal producing circuit 41 are supplied with the difference signal through the coherent detector 31. The amplitude and phase control signal producing circuit 41 is furthermore supplied with the first and the second interference signals f1 and f2.

It is to be pointed out that the residual component, if any, is included in the difference signal and is regenerated therefrom by the residual component regenerator 37. Moreover, the difference signal carries information relating to the carrier component of the device input signal IN. The carrier component is regenerated by the carrier regenerator 33 as the reference carrier signal. It is therefore understood that the control signal producing circuit is responsive to the difference signal and the interference signals f1 and f2 and produces the amplitude and phase control signals as will presently be described.

The amplitude and phase control signal producing circuit 41 comprises first and second 90° phase shifters 44 and 45 for giving a phase shift of 90° to the first and the second interference signals f1 and f2 to produce first and second phase shifted signals. First and second primary multipliers 46 and 47 are for multiplying the reference carrier signal by the first interference signal f1 and the first phase shifted signal to produce first and second baseband signals, which are recovered from the first interference signal f1 and have the 90° phase difference relative to each other. Similarly, third and fourth primary multipliers 48 and 49 are for producing third and fourth baseband signals, which are derived from the second interference signal f2 and have the 90° phase difference.

A first secondary multiplier 51 is for multiplying the first baseband signal by the regenerated residual component to produce a first amplitude error signal representative of the vector ΔE1 or ΔE2 described before. The first amplitude error signal is supplied to the first controllable attenuator 22 as the first amplitude control signal a1. A second secondary multiplier 52 is for multiplying the second baseband signal by the regenerated residual component to produce a first phase error signal indicative of the vector ΔE3 or ΔE4 mentioned above. The first phase error signal is delivered to the first controllable phase shifter 24 as the first phase control signal φ1. Likewise, third and fourth secondary multipliers 53 and 54 are for producing the second amplitude and phase control signals a2 and φ2, respectively.

A control loop is now formed for the amplitude and phase control circuit 21 so as to minimize the residual component which may appear in the difference signal as a result of the amplitude and the phase fluctuations of the interference component or components F1 and F2 in the device input signal IN. It should be understood in this connection that the amplitude and the phase control signals are produced by the amplitude and phase control signal producing circuit 41 as signals of very narrow bandwidths. The device input signal IN may be supplied to the amplitude and phase control circuit 21 through the narrow-band filters 11 and 12 and directly to the amplitude and phase control signal producing circuit 41.

Referring to FIG. 4, an alternative 37' of the residual component regenerator 37 is supplied with an optional one of the first and the second detector output signals as an input signal "in" from the four-phase phase detector 32. Let the input signal "in" take first and second binary levels V1 and V2 from time to time.

The alternative residual component regenerator 37' comprises first through third discriminators 56, 57, and 58 for discriminating the input signal "in" by first through third discrimination levels V1, (V1+V2)/2, and V2 to produce first through third discriminator output signals. The first and the second discriminator output signals are delivered to a first Exclusive OR gate 59, which produces a first Exclusive OR'ed signal. The third discriminator output signal and the first Exclusive OR'ed signal are supplied to a second Exclusive OR gate 60 for producing a second Exclusive OR'ed signal, which is a digital signal comprising the residual component as is the case with the signal produced by the residual component regenerator 37 described in conjunction with FIG. 1.

It is now understood that the interference elimination device illustrated with reference to FIG. 1, is simple in structure and yet is capable of eliminating the interference to an unexpected extent.

Figure 5:
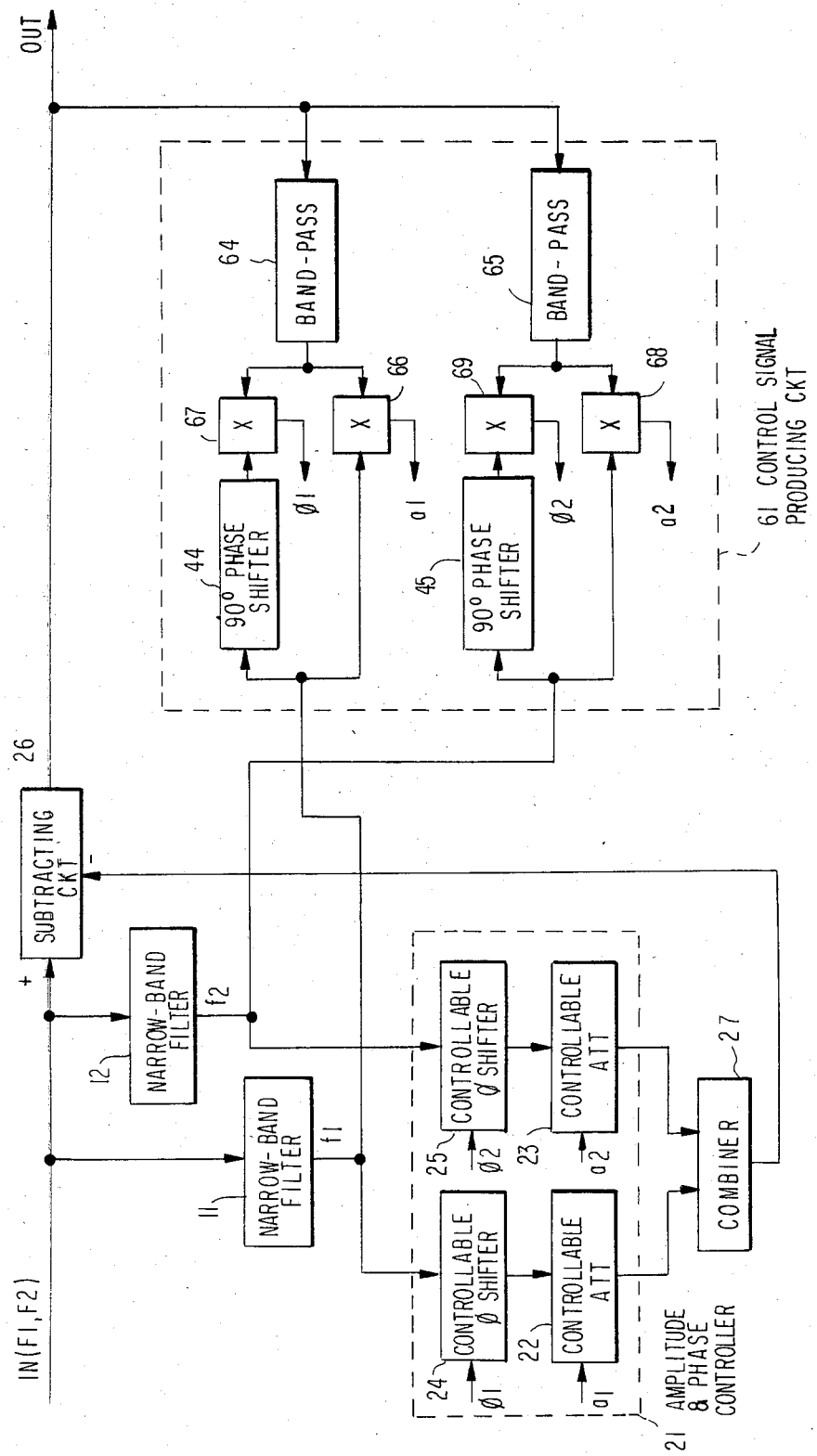
FIG. 5 is a block diagram of an interference elimination device according to a second embodiment of this invention.

Referring to FIG. 5, an interference elimination device according to a second embodiment of this invention comprises similar parts designated by like reference numerals and is operable by like signals. The output signal producing circuit is, however, a mere conductor for producing the difference signal as the device output signal OUT of the IF band. In the amplitude and phase control circuit 21, the first interference signal f1 is supplied at first to the first controllable phase shifter 24 and then to the first controllable attenuator 22. It will readily be appreciated that the order is immaterial to the operation of the interference elimination device according to this invention.

The control signal producing circuit is depicted at 61 and is responsive to the difference signal and the first and the second interference signals f1 and f2 to produce the amplitude and the phase control signals. In correspondence to the first and the second interference components F1 and F2, the control signal producing circuit 61 comprises first and second band-pass filters 64 and 65 supplied with the difference signal. The first band-pass filter 64 produces a first band limited signal including the residual component which results from the first interference component F1 and is represented in FIGS. 3 (A) and (B) by the vector ΔE1 or ΔE2 and the vector ΔE3 or ΔE4. The second band-pass filter 65 likewise produces a second band limited signal including the residual component which results from the second interference component F2 and is represented by the vectors ΔE1 or ΔE2 and ΔE3 or ΔE4.

A first multiplier 66 is for multiplying the first interference signal f1 by the first band limited signal (E1 or E2) to produce the first amplitude control signal a1. A second multiplier 67 is for multiplying the first phase shifted signal by the first band limited signal (ΔE3 or ΔE4) to produce the first phase control signal φ1. Similarly, third and fourth multipliers 68 and 69 are for producing the second amplitude and phase control signals a2 and φ2. The band-pass filters 64 and 65 are for improving the C/N at the multipliers 66 through 69 and thereby for stabilizing their operation. It will readily be seen that each pair of an amplitude and a phase control signal is produced by an orthogonal multiplier comprising the 90° phase shifter 44 or 45 and the multipliers 66 and 67 or 68 and 69.

It is understood that the interference elimination device illustrated with reference to FIG. 5 is also simple in structure and is yet capable of eliminating the interference to a remarkable extent. Moreover, the control signal producing circuit is operable in the IF band.

While a few preferred embodiments of this invention have thus far been described, it will now readily be possible for one skilled in the art to carry this invention into effect in various other manners. For example, the digital microwave communication system may be a FSK, PSK or QAM system. The interference elimination device is applicable to any other digital microwave communication systems. The interference component may be optional in number and may result from any other different microwave communication system or systems in which the carrier component or components are dominant.

What is claimed is:

1. An interference elimination device for use in a digital microwave communication system, said device being responsive to an intermediate frequency device input signal accompanied by an interference carrier component of a frequency modulation microwave communication system and operating at an intermediate frequency band, for substantially eliminating said interference carrier component and comprising:

narrow-band filter means for extracting said interference carrier component from said device input signal to provide an interference carrier component signal;

control means responsive to an amplitude and a phase control signal for amplitude and phase controlling said interference carrier component signal to produce an amplitude and phase controlled signal;

subtracting means for subtracting said amplitude and phase controlled signal from said device input signal to produce a difference signal including a residual interference component; and control signal producing means responsive to said difference signal and said interference carrier component signal for producing said amplitude and said phase control signal.

2. An interference elimination device as claimed in claim 1, wherein:
output signal producing means is responsive to said difference signal for producing a device output signal with said residual component eliminated and comprises:
coherent detector means for regenerating a carrier component of said device input signal from said difference signal and for carrying out coherent detection on said difference signal by using the regenerated carrier component to produce a detector output signal; and
means responsive to said detector output signal for producing said device output signal with said residual component eliminated;
said control signal producing means comprising:
residual component regenerating means responsive to said device and said detector output signals for regenerating said residual component; and
amplitude and phase control signal producing means responsive to the regenerated residual component, said regenerated carrier component, said interference carrier component signal for producing said amplitude and said phase control signal.

3. An interference elimination device as claimed in claim 2, wherein said amplitude and phase control signal producing means comprises:
amplitude control signal producing means responsive to said regenerated carrier component, said regenerated residual component, and said interference carrier component signal for producing said amplitude control signal;
90° phase shifting means for giving a phase shift of 90° to said predetermined one of the device input signal and the interference carrier component signal to produce a phase shifted signal; and
phase control signal producing means responsive to said regenerated carrier component, said regenerated residual component, and said phase shifted signal for producing said phase control signal.

4. An interference elimination device as claimed in claim 1, wherein
output signal producing means for producing said difference signal as a device output signal in which said interference component is substantially eliminated;
said control signal producing means being orthogonal multiplying means for orthogonally multiplying said difference signal by said interference carrier component signal to produce said amplitude and said phase control signal.

5. An interference elimination device as claimed in claim 1, wherein said narrow-band filter comprises a phase-locking loop type of the tracking filter.

* * * * *